United States Patent [19]

LeJeune, Jr.

[11] Patent Number: 5,997,307
[45] Date of Patent: Dec. 7, 1999

[54] TRAINING DEVICE FOR MYRINGOTOMY AND MIDDLE EAR SURGERY

[76] Inventor: Francis E. LeJeune, Jr., 334 Garden Rd., River Ridge, La. 70123

[21] Appl. No.: 08/924,292

[22] Filed: Sep. 5, 1997

[51] Int. Cl.$^6$ .................................................. G09B 23/28
[52] U.S. Cl. ......................... 434/262; 434/267; 434/270
[58] Field of Search .................................. 434/262, 267, 434/270, 272

[56] References Cited

U.S. PATENT DOCUMENTS

| | | | |
|---|---|---|---|
| 2,778,125 | 1/1957 | Hantman | 35/17 |
| 3,009,267 | 11/1961 | Bezark | 35/17 |
| 4,209,919 | 7/1980 | Kirikae et al. | 35/17 |
| 4,944,681 | 7/1990 | Burgio et al. | 434/270 |
| 5,053,040 | 10/1991 | Goldsmith, III | 606/109 |
| 5,505,623 | 4/1996 | Chernack et al. | 434/272 |

*Primary Examiner*—Robert A. Hafer
*Assistant Examiner*—John Edmund Rovnak
*Attorney, Agent, or Firm*—Garvey, Smith, Nehrhbass & Doody, LLC

[57] ABSTRACT

A medical teaching apparatus enables medical students, physicians, and surgeons to hone their skills of examination and surgical procedures upon the human ear. This includes the tympanic membrane and also some structures of the human middle ear such as the malleus, the incus, and the stapes bones. The apparatus is in the form of a "book" like structure including two generally rectangular plates which can be joined by a hinge. When the book sections are closed one upon the other, abutting surfaces mate to sandwich a sheet of film therebetween that simulates a patient's tympanic membrane. Each of the sections has correspondingly sized and shaped openings through which a surgeon can insert an examination instrument or different types of surgical probes and instruments. One of the book sections carries an insert plug that reproduces structure of the patient's middle ear.

22 Claims, 5 Drawing Sheets

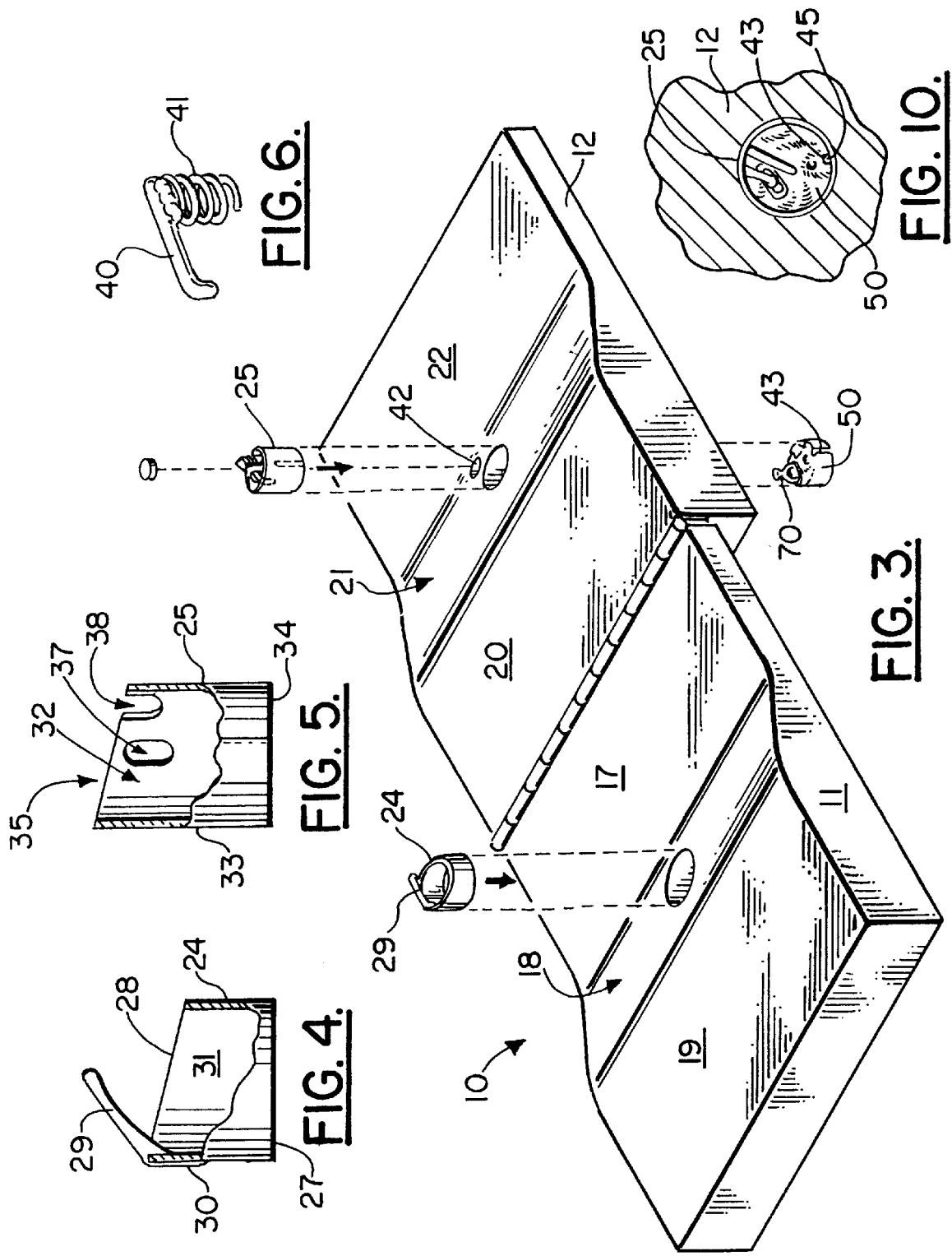

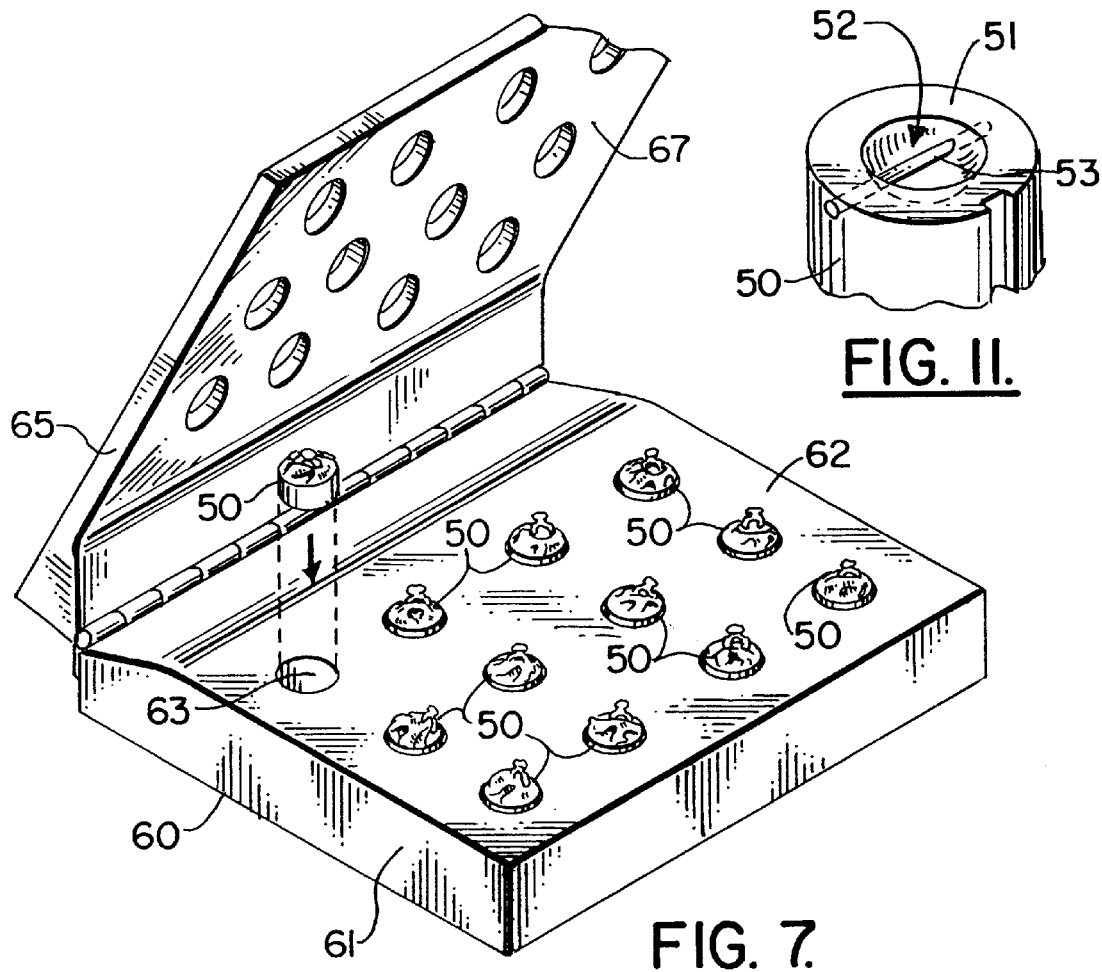
FIG. 11.
FIG. 7.
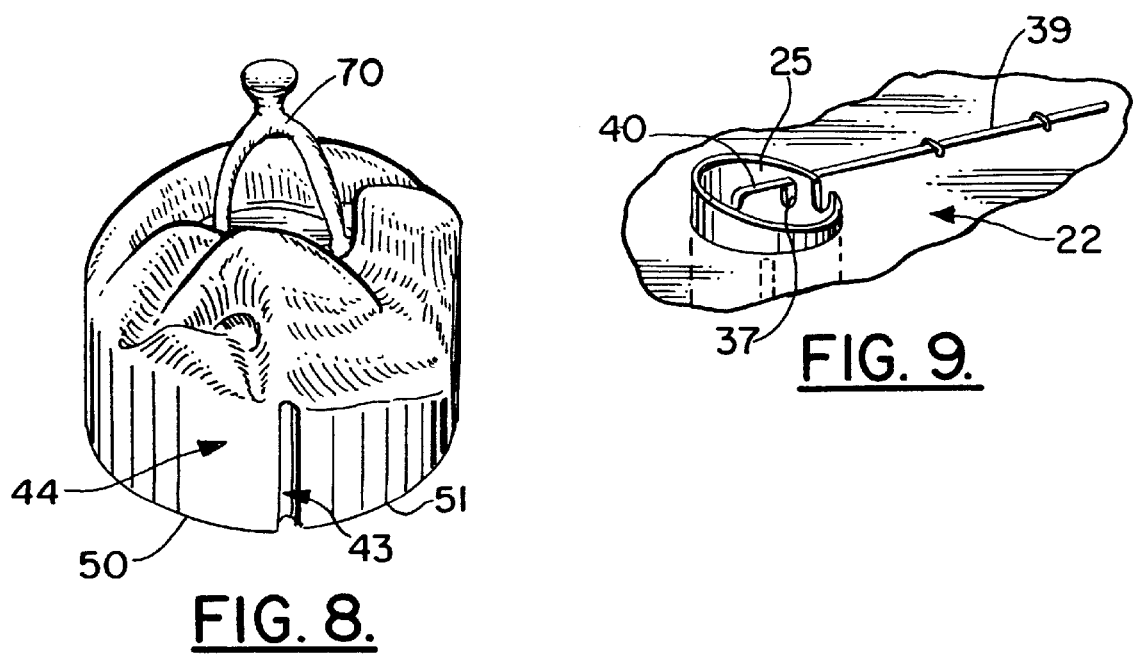
FIG. 9.
FIG. 8.

TRAINING DEVICE FOR MYRINGOTOMY AND MIDDLE EAR SURGERY

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to medical devices, and more particularly medical teaching devices for teaching the skills of examination and surgical procedures of the human ear. The present invention more particularly relates to an improved apparatus for teaching examination and surgical procedures of the human ear that includes a properly oriented tympanic membrane and anatomical structures of the middle ear, such as the malleus, the incus, and the stapes bones.

2. General Background of the Invention

A certain number of practitioners make a decision to "give up" stapedectomy procedures each year because of the time interval since their last procedure and/or the lack of an available temporal bone laboratory in which they can perform a number of practice procedures prior to the real one. There is thus a need for an inexpensive "trainer" that could simply be used in an office setting using an existing office microscope such as after patient visiting hours.

Numerous anatomical teaching devices have been patented, some of which are directed to the human ear. At least one prior art patent, U.S. Pat. No. 2,778,125, is directed to a teaching device that simulates the human ear. That patent was issued to Irvin Hantman and is entitled "Teaching Device Simulating The Human Ear".

Other patents that relate to anatomical displays include U.S. Pat. Nos. 3,009,267; 4,209,919; and 5,505,623. The present invention relates to a model that enables a surgeon to perform a myringotomy. The Goldsmith U.S. Pat. No. 5,053,040 is directed to a method of performing a myringotomy.

U.S. Pat. No. 4,944,681 discloses an ear examination simulator unit for use by parents, children and health care professionals to recognize ear disorders in children. The apparatus includes an ear structure simulator module that is mounted within a head portion of a furry animal facsimile. The ear structure simulator module includes a tube body having orifices defined in ends thereof for receiving an otoscope or other examination tool. Mounted within the tube portion is a semi-translucent membrane and a photographic slide depicting an eardrum in normal or various diseased states. A source of illumination provides light which is distributed by the membrane in order to provide back lighting of the images on the photographic slide. In addition, the membrane may be textured and colored so as to simulate a human eardrum in its healthy state.

BRIEF SUMMARY OF THE INVENTION

The present invention solves these prior art problems and shortcomings by providing a simple to use, uncomplicated "trainer" apparatus for teaching physicians and surgeons to perform ear procedures such as myringotomy and placement of P.E. or ventilation tubes. Pediatricians, family practitioners and surgeons who recognize the need for myringotomy, but who feel a deficiency in their training, would welcome such a training apparatus.

While no artificial device can completely reproduce the conditions of the operating room and the living patient, the present invention attempts to offer a reliable simulation of the middle ear structures with which some of the techniques for removal of the stapes and its replacement by one of several different prostheses can be performed. The incus, the long process, has a mobility which fairly closely reproduces the mobility of the normal ossicular chain. Crimping of the prosthesis on the incus allows a reasonable test of the hand/eye coordination of the surgeon.

The apparatus of the present invention provides a book-like structure that sandwiches a sheet of film therebetween to mimic a patient's tympanic membrane. Upper and lower tubes are positioned in upper and lower respective sections of the book-like member, each carrying anatomical parts of the human ear. When a surgeon closes the book-like member on the film member to simulate the ear drum, a life like representation of a human's middle ear is provided to the surgeon for practice purposes, such as for myringotomy and other ear procedures.

The main structure of the present invention is in the form of a "book": a bi-valved chassis consisting of two rectangular plates or sections (approximating e.g., 3"×4") which can be joined at one end by a metal piano-type hinge.

The upper or more superficial plate section represents the more lateral portion of the human ear while the lower or deeper plate section represents the more medial portions of the human ear.

When in the closed position, the two plates meet in a curvilinear plane best described as a gentle S-shape when viewed from the superior or inferior edge of the device (see FIG. 2).

At the center of these two plates a vertical shaft or channel has been bored so that it traverses both plates. This shaft can be for example about $12/32$" or $3/8$" in diameter in the upper plate section, but is slightly smaller in the lower or medial plate section at about $10/32$" or $5/16$". These dimensions help simulate human external and middle ear canal anatomy.

Where this shaft or channel intersects the plane of the under surface of the lateral plate section, an angle of approximately 42° is formed. This angle closely simulates the angle at which the human tympanic membrane meets the axis of the external ear canal. When a thin sheet of translucent plastic membrane is sandwiched between the two hinged plate sections, it lies in the same 42° angle relative to the $3/8$" shaft that the human tympanic membrane has to the external ear canal.

The upper surface of the medial or lower plate section has a similar but complementary curvature that matches the under surface contours of the lateral or upper plate. They fit each other as shown in FIG. 2.

The central shafts or bore of each of the two plates can be lined by tubing (e.g., brass tubing). The diameter of the tube in the lateral plate is about $12/32$—$3/8$ inches. The diameter of the tube in the medial plate is about $10/32$" or $5/16$".

Each tubing projects approximately 1 mm ($1/64$") above the contacting surfaces of the plate sections. The projecting tips of the lower brass and upper brass tubing meet when the hinged plates are closed. The rim of the lower tubing projects up and into the lumen of the upper plate tubing, a short distance, approximately 1 mm or 1/32".

An angled malleus pin approximately 6 mm or 1/4" is attached (e.g., by solder) to the medial end of the larger brass tubing and is angled approximately 45° medialward and posteriorly. When the plates are brought together, the surfaces meet, the two brass tubes, cut obliquely, inter-mesh and the pin projects into the lumen of the smaller tube, breaking their plane of contact by approximately 1/8".

When the thin translucent plastic membrane is positioned between the hinged plates and they are brought into contact and then gentle pressure is applied, the tapered angled pin, simulating the handle of the malleus, depresses the plastic membrane inward, deforming the sheet into a cone shape closely simulating the exponential cone shape of the normal human tympanic membrane. When viewed by a clinical otoscope or operating microscope, this membrane reflects light back to the viewer from the anterior inferior quadrant of the membrane in the same manner that occurs when viewing a normal human tympanic membrane.

The brass tubing in the medial plate of "the book" has a rounded notch in its superior rim to receive the 6 mm angled pin attached to the superficial plate which simulates the handle or long process of the malleus.

A second metal pin (incus pin), approximately 5 mm or about 3/16" is attached to the top of a coiled compression spring (e.g., by solder). This 1/8" diameter compression spring is then placed into a 5/32" hole or pit in the medial plate adjacent to the brass tubing of the medial or lower of the 2 hinged plates. A small window is created in the superior side of the 5/16" brass tubing near its obliquely cut edge. Through this small window, approximately 3 mm in diameter, centered about 5 mm from the edge of the 5/16" tube's superior, obliquely cut edge, the pin then projects into the simulated middle ear space. It closely resembles the long process of the incus. Its rocking motion closely simulates that of the normal human ossicular chain when palpated by the surgeon's angled pick.

The third element of the teaching device consists of a series of interchangeable middle ear plug inserts which simulate the medial wall of the middle ear space. This includes the anatomical features of the promontory, the oval window with the attached stapes bone, the niche to the round window, the gentle slope leading to the Eustacian tube anteriorly, the recess to the hypotympanum inferiorly, the tympanic recess and pyramidal process posteriorly, and the epitympanum, with the cochlear form process and the overhanging fallopian canal containing the facial nerve and artery superiorly.

The plug inserts can be constructed of a moldable material such as polyester resin the form of a cylinder approximately 9/32" in diameter and approximately 12/32" or 3/8" in length. The plugs fit snugly into the 10/32 or 5/16" brass tubing in the medial or lower plate of the device. The upper or presenting surface of each plug insert has the contours and relief of the medial wall of the middle ear space as mentioned above.

One last feature of "the book" is that a simulated auricle or external ear is attached to the upper surface of the lateral plate of the book. This is so aligned that the opening for the external ear canal overlays the 12/32" (3/8") hole drilled in the lateral plate of the device.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is an exploded perspective view of the preferred embodiment of the apparatus of the present invention;

FIG. 4 is a partial sectional elevational view of the preferred embodiment of the apparatus of the present invention illustrating the upper tube portion thereof;

FIG. 5 is a partial sectional elevational view of the preferred embodiment of the apparatus of the present invention illustrating the lower tube portion thereof;

FIG. 6 is a fragmentary perspective view of the preferred embodiment of the apparatus of the present invention illustrating the spring loaded incus portion thereof;

FIG. 7 is a perspective view of the preferred embodiment of the apparatus of the present invention illustrating the various anatomical inserts for use with the tube portions;

FIG. 8 is an enlarged fragmentary view of the preferred embodiment of the apparatus of the present invention illustrating an insert portion thereof;

FIG. 9 is a fragmentary perspective view of the preferred embodiment of the apparatus of the present invention illustrating an alternate construction of the spring loaded incus;

FIG. 10 is a partial top view of the preferred embodiment of the apparatus of the present invention illustrating the tube and insert portions thereof;

FIG. 11 is a fragmentary perspective bottom view of the preferred embodiment of the apparatus of the present invention illustrating the construction of the insert portion thereof;

DETAILED DESCRIPTION OF THE INVENTION

Figure 1:
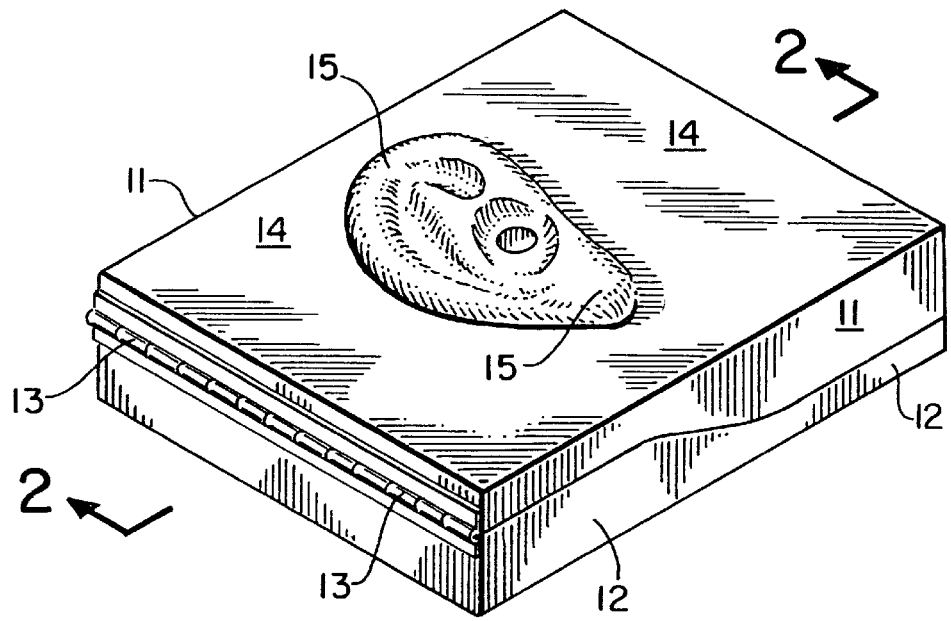
FIG. 1 is a perspective view of the preferred embodiment of the apparatus of the present invention.
Figure 2:
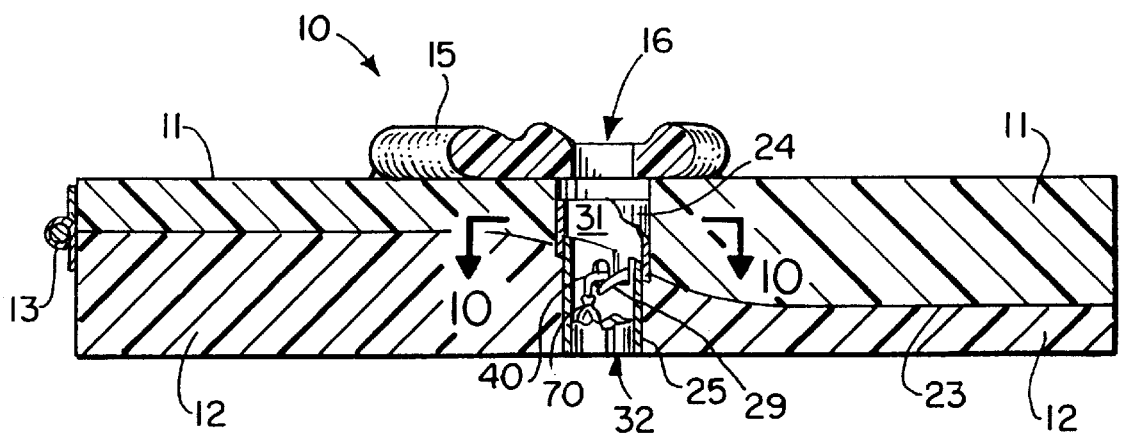
FIG. 2 is a sectional view taken along lines 2—2 of FIG. 1.

FIGS. 1–3 show generally the preferred embodiment of the apparatus of the present invention designated generally by the numeral 10. Medical teaching apparatus 10 enables a user to teach the skills of examination and certain surgical procedures upon the human ear.

The apparatus 10 includes a pair of book-like sections 11, 12 that are connected with hinge 13. Upper section 11 has an uppermost surface 14 that carries an anatomical reproduction of a human ear designated by the numeral 15. The anatomical reproduction ear 15 has an opening 16 through which a user can insert any number of instruments that are typically used by a physician when conducting an examination of a patient's middle ear drum, and other related anatomical structures. The opening 16 also enables a user to practice certain surgical procedures upon the human ear.

The upper section 11 includes an inner surface that is comprised of three planar surfaces 17–19. The section 17 is closest to hinge 13. It is the flat surface that is parallel to the flat surface 19. A diagonally extending surface 18 forms an angle of about 42° with both of the surfaces 17, 19. This angle approximates angulation of the human tympanic membrane.

The section 12 has a plurality of three surfaces 20–22 including a surface 20 that corresponds in size and shape to the surface 17, a surface 21 that corresponds in size and shape to the surface 18, and a surface 22 that corresponds in size and shape to the surface 19. Thus, when the two sections 11, 12 are closed one upon the other as shown in FIGS. 1 and 2, the surfaces 17 and 20 closely abut. Likewise, the surfaces 18 and 21 closely abut as do the surfaces 19 and 22. This "closed" configuration can best be seen in the sectional view of FIG. 2. During use, a user can place a thin film sheet 23 in between the sections 11, 12 to simulate a patient's tympanic membrane. This places the sheet of material 23 in between upper and lower tubes 24, 25 respectively.

Each tube 24, 25 projects approximately 1 mm (1/64") above the contacting surfaces of the plate sections 11, 12. The projecting tips of the lower tube 25 and upper tube 24 meet when the hinged plate sections 11, 12 are closed. The rim surface 35 of the lower tube 25 projects up and into the lumen 31 of the upper plate tube 24 as seen in FIG. 2, a short distance, approximately 1 mm or 1/32".

The upper and lower tubes 24, 25 are shown more particularly in FIGS. 4 and 5 respectively. The tube 24 fits in an opening 26 that extends between the surfaces 14, 18 of section 11. The tube 24 is generally cylindrically shaped, having a upper annular edge 27 and a lower edge 28 that form an acute angle with respect to each other as shown in FIG. 4. The shape of the surface 28 corresponds to the angulation of surface 18 of section 11.

An anatomically reproduced malleus 29 extends from the generally cylindrically-shaped wall 30 of tube section 24 into the bore 31 thereof, as shown in FIG. 4. Angled malleus pin 29 (approximately 6 mm or 1/4" in length) is attached (e.g., by solder) to the medial end of the larger tube 24 and is angled approximately 45° medialward and posteriorly. When the plate sections 11, 12 are brought together, the surfaces 17–19 and 20–22 meet, the two tubes 24, 25, cut obliquely, inter-mesh and the malleus pin 29 projects into the lumen 32 of the smaller tube 25, breaking their plane of contact by approximately 1/8".

Figure 22:
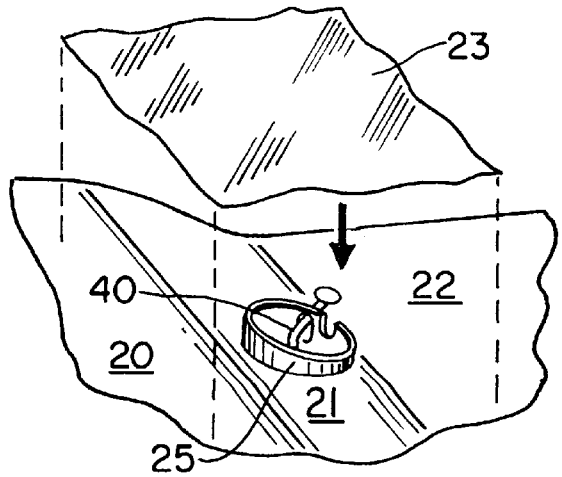
FIG. 22 is a perspective fragmentary view of the preferred embodiment of the apparatus of the present invention illustrating placement of a sheet of film material over the lower tube section and lower housing section in order to simulate a patient's tympanic membrane.
Figure 23:
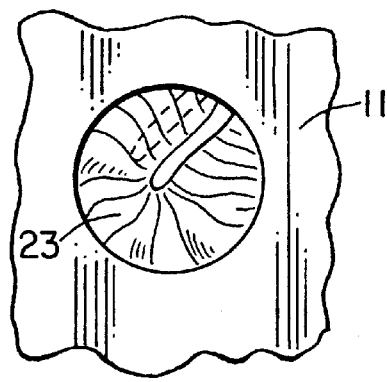
FIG. 23 is a fragmentary view of the preferred embodiment of the apparatus of the present invention illustrating the body sections sandwiching the film section therebetween to simulate the patient's tympanic membrane.

When the thin translucent plastic film membrane 23 is positioned between the hinged plate sections 11, 12 and they are brought into contact and then gentle pressure is applied, the tapered angled malleus pin 29, simulating the handle of the malleus, depresses the plastic membrane 23 inward (see FIGS. 22–23), deforming the sheet 23 into a cone shape closely simulating the exponential cone shape of the normal human tympanic membrane. When viewed by a clinical otoscope or operating microscope, this film membrane 23 reflects light back to the viewer from the anterior inferior quadrant of the membrane 23 in the same manner that occurs when viewing a normal human tympanic membrane.

The tube section 25 has a bore 32 surrounded by wall 33. The wall 33 has an edge 34 that tracks the underside 36 of section 12, a generally flat surface. An upper rim surface 35 of tube section 25 is angled to correspond to the surface 21 of section 12. A pair of slots 37, 38 accept simulated bone parts of the middle ear when the sections 11 and 12 are closed. Incus pin 40 is the second metal pin. It can be approximately 5 mm or about 3/16" in length and is attached to the top of a coiled compression spring 41 (e.g., by solder). This 1/8" diameter compression spring 41 is then placed into a 5/32" hole 42 in the medial plate 12 adjacent to the tube of the medial or lower 12 of the 2 hinged plates.

A small window 38 is created in the superior side of the 5/16" tubing 25 near its obliquely cut edge 35. Through this small window, approximately 3 mm in diameter, centered about 5 mm from the edge of the tube 25 superior, obliquely cut edge 35, the incus pin 40 then projects into the simulated middle ear space. It closely resembles the long process of the incus. Its rocking motion closely simulates that of the normal human ossicular chain when palpated by the surgeon's angled pick. Thus, incus pin 40 is spring mounted upon coil spring 41 so that it accurately mimics a springing action of a human incus for the practicing surgeon. The coil spring 40 is mounted in a small opening 42 of section 12 at surface 21 as shown in FIG. 3.

The third element of the teaching device consists of a series of interchangeable middle ear plug inserts 50 (see FIGS. 8 and 12–21) which simulate the medial wall of the middle ear space. This includes the anatomical features of the promontory, the oval window with the attached stapes bone, the niche to the round window, the gentle slope leading to the Eustacian tube anteriorly, the recess to the hypotympanum inferiorly, the tympanic recess and pyramidal process posteriorly, and the epitympanum, with the cochlearform process and the overhanging fallopian canal containing the facial nerve and artery superiorly.

The plug inserts 50 can be constructed of a moldable material such as polyester resin the form of a cylinder approximately 9/32" in diameter and approximately 12/32" or 3/8" in length. The plugs 50 fit snugly into the bore or lumen 32 of tube 25 in the medial or lower plate section 12. The upper or presenting surface of each plug insert 50 has the contours and relief of the medial wall of the middle ear space.

A number of different insert plugs 50 can thus be provided, each being interchangeably attachable to the bore 32 of tube section 25 to depict different anatomical situations. In FIGS. 3 and 8, insert plug 50 is generally cylindrically shaped having a flat underside 51 with a hemispherical socket 52 having a handle or pin 53. This enables a surgeon to grab and manipulate each plug 50 at its handle or pin 53 and place it into the bore 32 of tube section 25 for training purposes.

A small long-nosed plier, such as a hemostat, can readily grasp and engage the plug insert 50 at handle 53 and guide the plug 50 into and out of the bore 32 of tube 25. A linear groove 43 on the side 44 of each plug insert 50 approximately (e.g., 1/64" wide), extending the full length of the plug insert 50 assists in properly orienting the plug insert as it is placed into the brass tubing. A metal keyway 45 approximately 1/64" wide is affixed to the inner wall of the tube 25 match and properly orient the groove 43 within the plug.

The depth for insertion of the plug 50 into the tube 25 is at the same level as the under surface of the medial plate. To properly place a plug 50, the groove 43 in the side 44 of the plug 50 is aligned with the keyway 45 metal within the tube 25 and is directed partially into the tube 25. Then the device 10 is placed on a flat surface and gentle pressure is made on the sections 11, 12 until the plug 50 as moved into the tube 25 and is now flush with the bottom of the medial plate 11. This is the proper level, and the head of the stapes bone 70 in the plug 50 should be in very close proximity to the lenticular process of the long process of the incus pin 40. The operator is then ready to open the device and visualize the medial wall of the middle ear in preparation for manipulating the ossicles.

As shown in FIGS. 12–21, a number of different insert plugs 50, each of different anatomical construction can be provided for teaching and training medical students, doctors, surgeons, and the like. In FIG. 7, a carrying case 60 can provide a lower section 61 having a flat surface 62 with a plurality of sockets 63 into which the insert plugs 50 can be placed as shown by the arrow 64 in FIG. 7. Because of the delicate nature of the insert plugs 50, an upper case portion 65 likewise has sockets 66 at surface 67 in order to receive the upper portion of each insert plug that carries simulated bone parts such as the stapes 70 in FIG. 8.

FIG. 9 shows an alternate construction of the incus bone 40 shown in FIG. 6. In FIG. 9, the incus bone 40 is shown attached through opening 37 of tube section 25. While the embodiment of FIG. 6 has a coil spring 41 carrying the incus 40, the embodiment of FIG. 9 uses an elongated metallic beam 39 that is secured using staples, glue, or the like to surface 22 of section 12.

In operating the training device of the present invention, a user places the device on a relatively flat surface such as desk or operating table. An operating microscope may be suitably positioned for the operator to view through, or if only limited work is to be performed, a battery powered otoscope may suffice.

The apparatus 10 is opened in the same manner one would open a real book. The sheet of thin translucent plastic membrane 23, (e.g., approximately 3"×4") is placed on the surfaces 20–22 of the medial or lower plate 12. The lateral plate 11 is then closed in the same manner as one would close the cover of a book. Gentle pressure is applied to complete the closure with film 23 in between sections 11, 12.

The external ear canal of the simulated auricle, can then be inspected using a battery powered hand held otoscope or an operating microscope with metal ear speculum. The plastic translucent membrane will then be visualized, closely resembling the normal human tympanic membrane. A reflection of light will be observed in the anterior inferior quadrant of the membrane just as it is seen in the normal human membrane. This may be palpated with a probe, it may be incised in a linear radial direction with a myringotomy knife, or incised in a direction parallel to the circumference of the tympanic membrane if a greater opening is desired. A ventilation tube of any one of a number of designs may then be inserted into the incision by use of an alligator forceps or other insertion instrument.

If the operator wishes to practice more intricate surgical procedures in the middle ear chamber, he or she can now open the book to gain the same surgical exposure that would be achieved by elevating and reflecting the tympanic membrane forward in the living patient.

If a stapedectomy procedure was selected for study, a middle ear plug 50 would be chosen that portrayed a rather limited degree of otosclerotic fixation (see FIG. 12), that is, two or three sites of micro-involvement of the annular ligament of the stapes foot plate.

This would be inserted into the brass tubing on the under surface of the medial plate of "the book". Using a hemostat to place the plug in the brass tube, aligning the groove in the plug to fit the metal strip in the brass tubing and placement to a depth that placed its surface flush with surface of the lower or medial plate will assure quick and proper placement of this particular plug.

After removal and replacement of the stapes 70 by one of many available prosthetic stapes devices, the operator could remove the plug and replace it with another plug depicting a more advanced degree of foot plate fixation. After mastering this degree of disease, the next plug 50 could be one which portrayed advanced otosclerosis requiring a drill-out procedure with use of a piston prosthesis to attach to the long process of the incus.

Other plugs 50 would be available which would portray some of the less common anatomical anomalies that might be encountered in middle ear surgery. These could include overhanging facial nerve canal which would be mildly occlusive to the oval window anatomy. Another could be moderately occlusive to the oval window. Another could be severely occlusive to the oval window structures.

Still other plugs could depict some of the vascular anomalies such as mild, moderate, or severe enlargement of the jugular bulb. A persistent stapedial artery coursing between the anterior and posterior crura of the stapes might be observed and dealt with. An infinite variety of plugs depicting unusual anatomical formations or disease states could be portrayed from information supplied by recognized otologic surgeons who might wish to contribute their experience to their fellow practitioners.

In FIGS. 12–21, letters designate certain anatomical features. The promontory P, oval window W, niche to round window n, eustachian tube E, hypotympanum H, and sinus tympani S, pyramidal process PP, fallopian F, cochleorform process C and stapedial artery SA are shown in the FIGS. 12–21 that will be discussed hereinafter.

Figure 12:
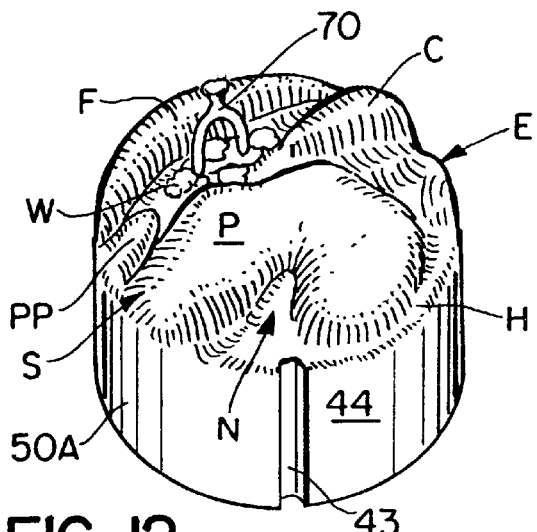
FIGS. 12–21 are schematic view illustrating various insert portions of the preferred embodiment of the apparatus of the present invention depicting different anatomical and teaching situations.

FIG. 12 is a normal middle ear anatomy with minimal degree of foot plate fixation: otosclerotic foci anteriorly and posteriorly, with early foci superiorly and interiorly also. Center of foot plate is still thin and translucent or blue.

Figure 13:
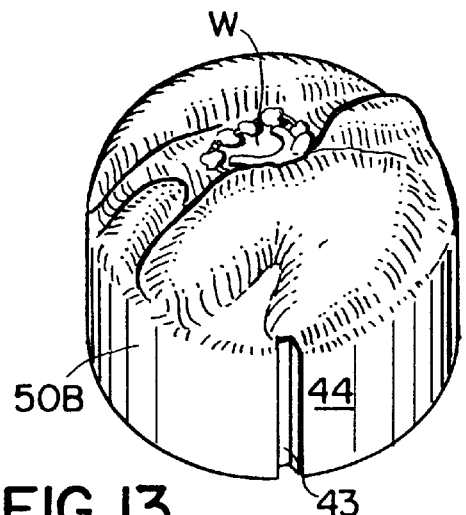

FIG. 13 shows more advanced degree of footplate fixation with multiple foci involving annular ligament.

Figure 14:
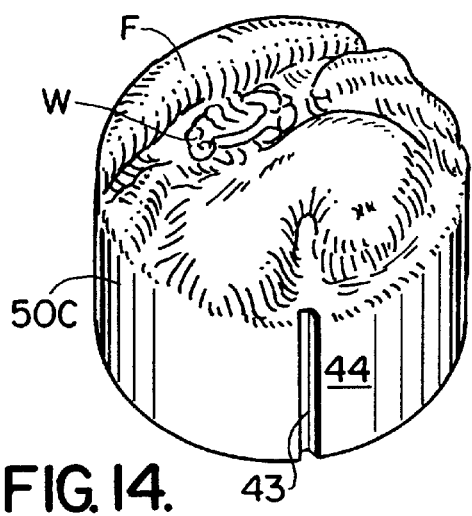

FIG. 14 shows a still more advanced degree of footplate fixation. Footplate is totally opaque. Annular ligament is no longer visible.

Figure 15:
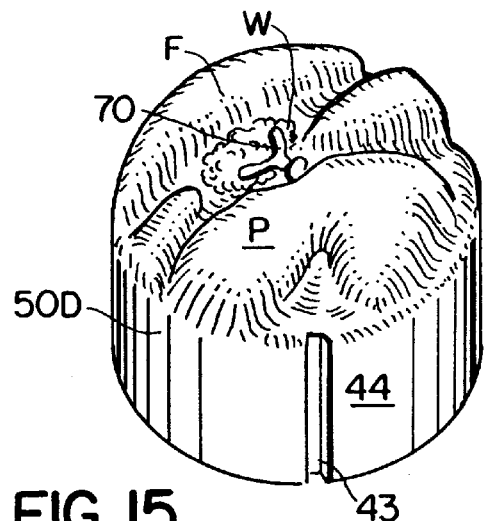

FIG. 15 shows a very thickened footplate which has the "swollen bisquet" appearance. This cannot be removed and the alternative surgical approach includes a use of microdrill followed by the placement of a piston type of stapedial prosthesis.

Figure 16:
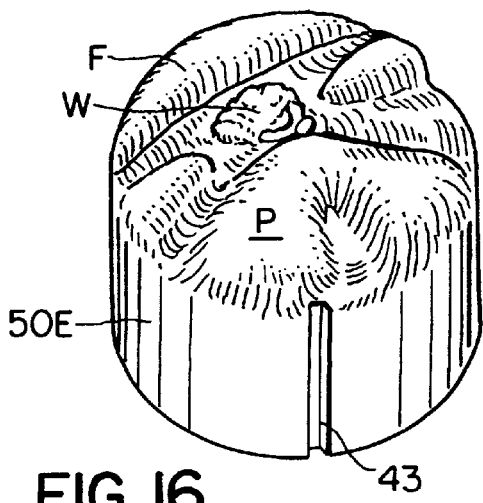

FIG. 16 shows total obliteration of the footplate and oval window fossa. The presence of otospongiosis with increased vascularity of the bone and increased risk of bleeding into the vestibule makes successful surgery highly unlikely. Amplification would be preferred.

Figure 17:
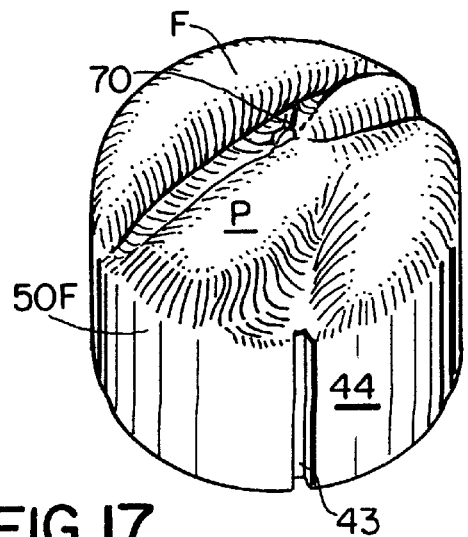

FIG. 17 shows a moderately prominent Fallopian canal which overhangs the oval window making access to the superstructure and footplate of the stapes difficult.

Figure 18:
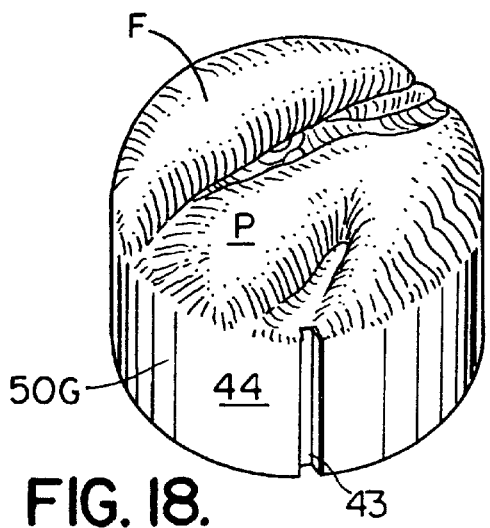

FIG. 18 shows a more severe degree of facial canal overhang making access to the footplate impossible without severely compromising the facial nerve.

Figure 19:
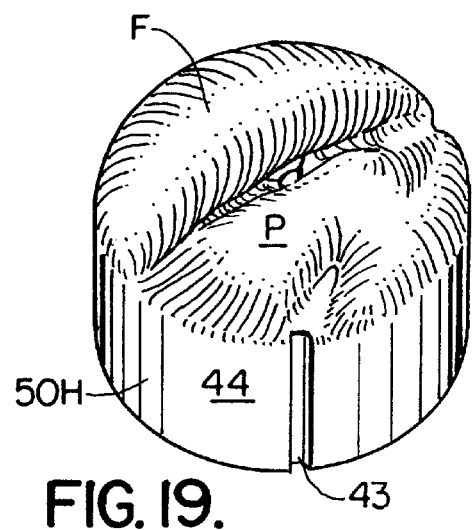

FIG. 19 shows an extreme degree of overhanging facial canal overhang rendering stapedectomy totally impossible. Abandon the procedure.

Figure 20:
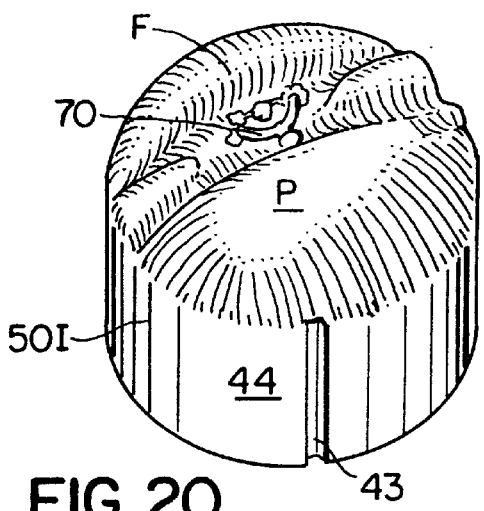

FIG. 20 shows displacement of the footplate partially into the oval window increasing the risk for damage to vestibule by drill, pick or laser. In such a case a surgeon may consider abandoning the procedure.

Figure 21:
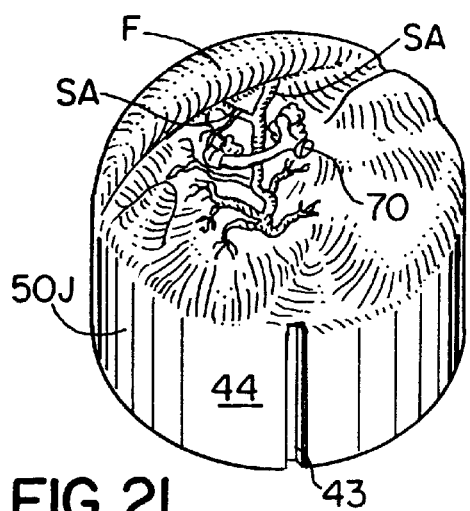

FIG. 21 shows persistent stapedial artery coursing through crura of stapes. There is increased risk for bleeding into vestibule if stapedectomy is attempted.

The following table lists the parts numbers and parts descriptions as used herein and in the drawings attached hereto.

| PARTS LIST | |
|---|---|
| Part Number | Description |
| 10 | medical training device |
| 11 | section |
| 12 | section |
| 13 | hinge |
| 14 | upper surface |
| 15 | ear |
| 16 | opening |
| 17 | surface |
| 18 | surface |
| 19 | surface |
| 20 | surface |
| 21 | surface |
| 22 | surface |
| 23 | film sheet |
| 24 | tube |
| 25 | tube |
| 26 | opening |
| 27 | annular edge |
| 28 | lower edge |
| 29 | malleus |
| 30 | wall |
| 31 | bore |
| 32 | bore |
| 33 | wall |
| 34 | edge |
| 35 | surface |
| 36 | underside |
| 37 | slot |
| 38 | slot |
| 39 | beam |
| 40 | incus |
| 41 | spring |
| 42 | opening |
| 43 | groove |
| 44 | side |
| 45 | keyway |
| 50 | plug insert |
| 60 | carrying case |
| 61 | lower section |
| 62 | flat surface |
| 63 | socket |
| 64 | arrow |
| 65 | upper portion |
| 66 | socket |
| 67 | surface |
| 70 | stapes |
| P | promontory |
| W | oval window |
| n | niche to round window |
| E | eustachian tube |
| H | hypotymponum |
| S | sinus tympani |
| pp | pyramidal process |
| F | fallopian |
| C | cochleorform process |
| SA | stapedial artery |

The foregoing embodiments are presented by way of example only; the scope of the present invention is to be limited only by the following claims.

I claim:

1. A medical teaching apparatus for teaching the skills of examination and certain surgical procedures upon the human ear to medical students, physicians, and surgeons, comprising:

a) an instrument body that includes a pair of body sections including an upper section and a lower section, each of the sections having corresponding mating surfaces that include at least first and second diagonally extending surfaces respectively;

b) each of the diagonally extending surfaces carrying a tube section with a bore having a central axis, at least one of the tube sections having an anatomically configured part that depict bone parts of the human ear;

c) a sheet of film material; and d) the tube sections and instrument body sections being configured to enable said sheet of film material to be inserted in between the body sections along an angled path relative to the central axis to thereby simulate a patient's tympanic membrane.

2. A medical teaching apparatus for teaching the skills of examination and certain surgical procedures upon the human ear to medical students, physicians, and surgeons, comprising:

a) an instrument body that includes a pair of body sections including an upper section and a lower section, each of the sections having corresponding mating sufaces that include at least first and second diagonally extending surfaces respectively;

b) each of the diagonally extending surfaces carrying a tube section with a bore, at least one of the tube sections having an anatomically configured part that depict bone parts of the human ear;

c) a sheet of film material; and d) the tube sections and instrument body sections being configured to enable said sheet of film material to be inserted in between the body sections to thereby simulate a patient's tympanic membrane; and c) an insert plug that fits one of the tube sections, the insert plug carrying anatomically simulated portions of a patient's middle ear including at least a stapes bone.

3. The apparatus of claim 2 wherein the combination of the tube sections and insert plug carry simulated ear bones including at least the malleus, incus, and stapes.

4. The apparatus of claim 2 wherein there are a plurality of insert plugs, each depicting a different anatomical configuration for a human inner ear.

5. The apparatus of claim 1 further comprising a spring loaded bone part supported by one of the sections that simulates the mobility of a patient's incus bone.

6. The apparatus of claim 1 wherein the body sections are pivotally connected together.

7. A medical teaching apparatus for teaching the skills of examination and certain surgical procedures upon the human ear to medical students, physicians, and surgeons, comprising:

a) an instrument body that includes a pair of body sections including an upper sections and a lower section, each of the sections having corresponding mating surfaces that include at least first and second diagonally extending surfaces respectively;

b) each of diagonally extending surfaces carrying a tube section with a bore, at least one of the tube sections having an anatomically configured part that depict bone parts of the human ear;

c) a sheet of film material; and d) the tube sections and instrument body sections being configured to enable said sheet of film material to be inserted in between the body sections to thereby simulate a patient's tympanic membrane and wherein one of the sections carries an anatomically simulated human middle ear bone and the other tube section carries a different anatomically simulated middle ear bone.

8. The apparatus of claim 4 wherein the insert plugs are of a corresponding shape so that each removably fits one of the tube sections.

9. The apparatus of claim 1 wherein the tube sections have a common central longitudinal axis.

10. The apparatus of claim 9 wherein the central longitudinal axis of the tube sections forms an acute angle with the diagonally extending surfaces.

11. A medical teaching apparatus for teaching the skills of examination and certain surgical procedures upon the human ear to medical students, physicians, and surgeons, comprising:

a) an instrument body that includes a pair of body sections including an upper section and a lower section, each of the sections having corresponding mating surfaces that include at least first and second diagonally extending surfaces respectively;

b) each of the diagonally extending surfaces carrying a tube section with a bore, at least one of the tube sections having an anatomically configured part that depict bone parts of the human ear;

c) a sheet of film material that can be positioned in between the tube sections forming an angle with the tube axis to simulate a patient's tympanic membrane, wherein the film is oriented at an acute angle relative to the central longitudinal axis of the tube sections; and d) the tube sections and instrument body sections being configured to enable said sheet of film material to be inserted in between the body sections to thereby simulate a patient's tympanic membrane.

12. A medical teaching apparatus for teaching the skills of examination and certain surgical procedures upon the human ear to medical students, physicians, and surgeons, comprising;

a) an instrument body that includes a pair of body sections including an upper section and a lower section, each of the sections having corresponding mating surfaces that include at least first and second diagonally extending surface respectively;

b) each of the diagonally extending surfaces carrying a tube section with a bore, at least one of the tube sections having an anatomically configured part that depict bone parts of the human ear;

c) a sheet of film material that can be positioned in between the tube sections to simulate a patient's tympanic membrane, wherein the film is oriented at an acute angle relative to the central longitudinal axis of the tube sections; and d) the tube sections and instrument body sections being configured to enable said sheet of film material to be inserted in between the body sections to thereby simulate a patient's tympanic membrane; and e) an insert plug that fits one of the tube-sections, the insert plug carrying anatomically simulated portions of a patient's middle ear including at least a stapes bone.

13. The apparatus of claim 12 wherein the combination of the tube sections and insert plug carry simulated ear bones including at least the malleus, incus, and stapes.

14. The apparatus of claim 11 wherein each tube section has an angled surface that forms an acute angle with the central longitudinal axis of the tube sections during use.

15. The apparatus of claim 11 wherein the frame sections are pivotally connected together.

16. The apparatus of claim 11 wherein one of the tube sections carries an anatomically simulated human middle ear bone and the other tube section carries a different anatomically simulated middle ear bone.

17. The apparatus of claim 11 wherein one of the tube sections receives a malleus simulating projection that extends into the bore of said tube section.

18. The apparatus of claim 12 wherein one of the tube sections receives an incus simulating projection that extends into the bore of said tube section.

19. The apparatus of claim 13 wherein the mallcus and incus simulating projections supported by the combination of body sections and tube sections extend into the respective bores of the tube sections.

20. The apparatus of claim 19 wherein the malleus and incus simulating projections are positioned on opposite sides of the sheet of film material during use.

21. A medical teaching apparatus for teaching the skills of examination and certain surgical procedures upon the human ear to medical students, physicians, and surgeons, comprising:

a) an instrument body that includes a pair of body sections including an upper section and a lower section, each of the sections having corresponding mating surfaces that include at least first and second diagonally extending surfaces respectively;

b) each of the diagonally extending surfaces carrying a tube section with a bore having a central axis, at least one of the tube sections having an anatomically configured part that depict bone parts of the human ear;

c) a sheet of film material; and d) the tube sections and instrument body sections being configured to enable said sheet of film material to be inserted in between the body sections to thereby simulate a patient's tympanic membrane; and e) an insert plug that fits one of the tube sections, the insert plug carrying anatomically simulated portions of a patient's middle ear including at least a stapes bone.

22. A medical teaching apparatus for teaching the skills of examination and certain surgical procedures upon the human ear to medical students, physicians, and surgeons, comprising:

a) an instrument body that includes a pair of body sections including an upper section and a lower section, each of the sections having corresponding mating surfaces that include at least first and second diagonally extending surfaces respectively;

b) each of the diagonally extending surfaces carrying a tube section with a boe having a central axis, at least one of the tube sections having an anatomically configured part that depict bone parts of the human ear;

c) a sheet of film material; and d) the tube sections and instrument body sections being configured to enable said sheet of film material to be inserted in between the body sections along an angled path relative to the central axis to thereby simulate a patient's tympanic membrane.

\* \* \* \* \*